United States Patent
Boehringer et al.

(10) Patent No.: US 6,186,265 B1
(45) Date of Patent: Feb. 13, 2001

(54) ARRANGEMENT FOR CONTROLLING THE STEERING ANGLE OF A MOTOR VEHICLE

(75) Inventors: Michael Boehringer, Waiblingen; Lutz Eckstein, Stuttgart, both of (DE)

(73) Assignee: DaimlerChrysler AG, Stuttgart (DE)

(*) Notice: Under 35 U.S.C. 154(b), the term of this patent shall be extended for 0 days.

(21) Appl. No.: 09/012,458

(22) Filed: Jan. 23, 1998

(30) Foreign Application Priority Data

Jan. 23, 1997 (DE) .............................. 197 02 313

(51) Int. Cl.⁷ ...................................................... B62D 5/07
(52) U.S. Cl. ............................................ 180/402; 280/773
(58) Field of Search ..................................... 180/402, 403, 180/415, 446; 280/773

(56) References Cited

U.S. PATENT DOCUMENTS

| | | | |
|---|---|---|---|
| 1,721,171 | * 7/1929 | Antrainer et al. | 280/773 |
| 3,022,850 | 2/1962 | Bidwell et al. | 180/77 |
| 3,463,423 | * 8/1969 | Wong et al. | 244/83 |
| 4,441,572 | * 4/1984 | Ito et al. | 180/140 |
| 4,690,431 | * 9/1987 | Ito et al. | 280/771 |
| 4,708,220 | * 11/1987 | Noto et al. | 180/142 |
| 4,909,343 | * 3/1990 | Mouri et al. | 180/446 |
| 4,984,646 | * 1/1991 | Sano et al. | 180/79.1 |
| 5,135,069 | * 8/1992 | Hattori et al. | 180/142 |
| 5,275,250 | * 1/1994 | Muller et al. | 180/402 |
| 5,327,896 | * 7/1994 | Saita | 180/446 |
| 5,347,458 | * 9/1994 | Serizawa et al. | 364/424.05 |
| 6,041,882 | * 3/2000 | Bohner et al. | 180/402 |
| 6,059,068 | * 5/2000 | Kato et al. | 180/402 |
| 6,082,482 | * 7/2000 | Kato et al. | 180/402 |

FOREIGN PATENT DOCUMENTS

| | | |
|---|---|---|
| 44 03 379 A1 | 8/1994 | (DE) . |
| 195 19 875 | 7/1996 | (DE) . |
| 196 00 139 C1 | 5/1997 | (DE) . |
| 196 25 498 C1 | 11/1997 | (DE) . |
| 0 539 823 | 5/1993 | (EP) . |
| 997804 | * 7/1965 | (GB) ................................. 280/773 |
| 1002557 | 8/1965 | (GB) . |
| 2308832 | 9/1997 | (GB) . |
| 62-46775 | 2/1987 | (JP) . |
| 62-71757 | 4/1987 | (JP) . |
| 4-19271 | 1/1992 | (JP) . |
| 4-87881 | 3/1992 | (JP) . |

OTHER PUBLICATIONS

U. Bolte, "The Active Adjusting Part—an Ergonomic Operating Concept", Fortschr.,–Ber. VDI Series 17, No. 75, Düsseldorf, VDI–Verlag 1991, 7 sheets.

* cited by examiner

Primary Examiner—Brian L. Johnson
(74) Attorney, Agent, or Firm—Evenson, McKeown, Edwards & Lenahan, P.L.L.C.

(57) ABSTRACT

An arrangement controls the steering angle of a motor vehicle and the like which contains a user-controllable operating element and a vehicle longitudinal speed sensor system. A steering angle adjusting device is coupled with the longitudinal speed sensor system and the operating element such that the desired steering angle value is indicated as a function of the control force exercised on the operating element and the sensed longitudinal speed of the vehicle. Control element deflection devices deflect the operating element corresponding to the respective existing actual steering angle value.

3 Claims, 1 Drawing Sheet

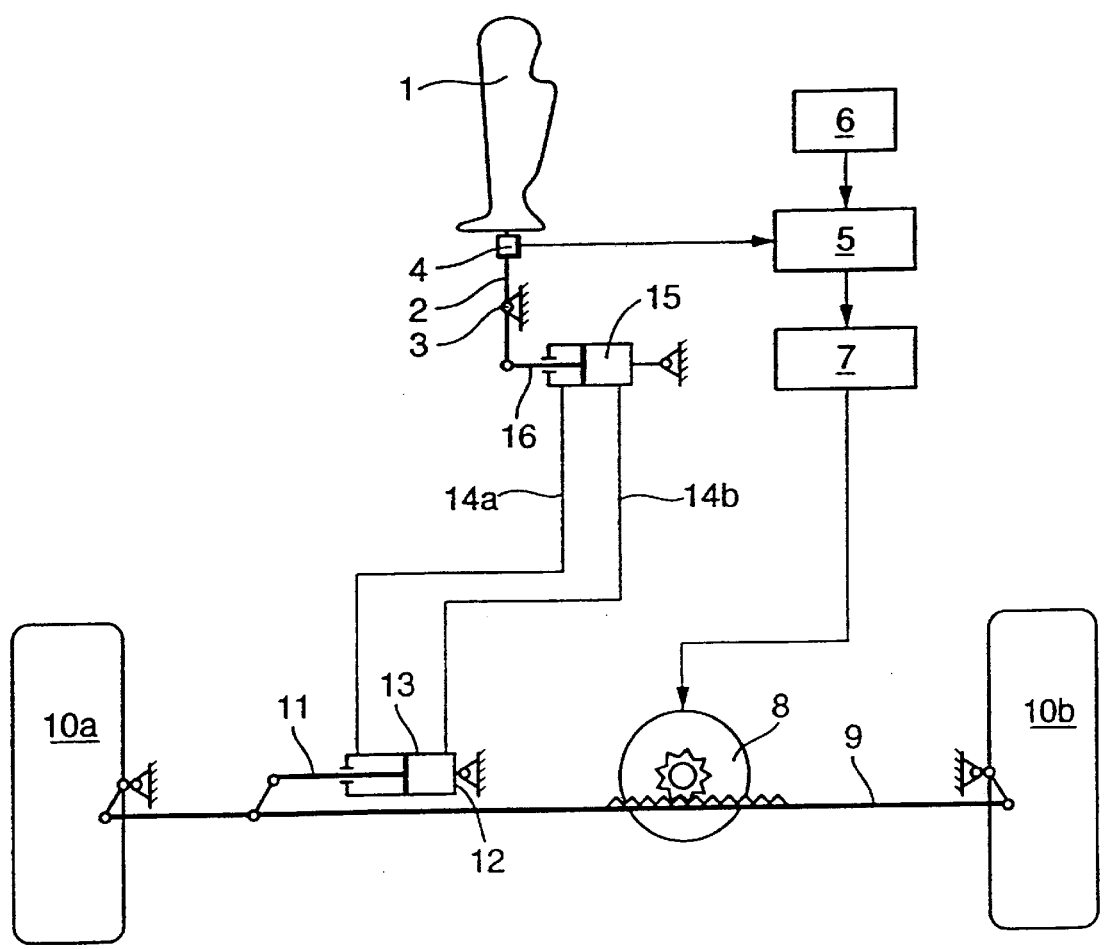

ARRANGEMENT FOR CONTROLLING THE STEERING ANGLE OF A MOTOR VEHICLE

BACKGROUND OF THE INVENTION

The present invention relates to an arrangement for controlling the steering angle of a motor vehicle, and more particularly, to a steering angle control arrangement having a user-controllable operating element, a vehicle longitudinal speed sensor system, and a steering angle adjusting device which is coupled such with the vehicle longitudinal speed sensor system and the operating element that the desired steering angle value is determined as a function of the control force exercised on the operating element and of the sensed vehicle longitudinal speed.

In known steering angle control arrangements as used, for example, in automobiles, the desired steering angle value for the steering angle adjusting device is variable as a function of the control force exercised on the operating element as well as of the momentary longitudinal vehicle speed. Such an arrangement replaces, for example, a conventional steering system having a steering wheel and a steering angle adjusting device mechanically connected thereto in the case of automobiles, as a result of which comparatively short adjusting paths and high adjusting speeds can be achieved.

Operating elements, as they are used here and on which the control force is exerted to influence the determination of the desired steering angle value, are called isometric operating elements. According to whether the operating element is arranged in a rigid manner or, for providing an intuitive acknowledgment of one or several quantities representative of driving dynamics, is arranged to be deflectable, it is called a passive or active operating element. For fulfilling a satisfactory steering functionality, these operating-element-related characteristics are preferably combined with a speed-dependent steering ratio; i.e., the desired steering angle value is, in addition, determined as a function of the respective actual longitudinal vehicle speed.

In these steering angle control arrangements, no direct mechanical connection exists between the operating element and the steering angle adjusting device and thus the controlled vehicle wheels. Consequently, the driver loses the acknowledgment with respect to the respective steering condition which is normally transmitted by way of this connection. Various attempts have been made to compensate for this loss. In, for example, U. Bolte, "The Active Adjusting Part—an Ergonomic Operating Concept", *Fortschr.,-Ber. VDI Series* 17, No. 75, Düsseldorf, VDI-Verlag 1991, the deflection of the operating element as a function of the yaw velocity is, for example, suggested as the acknowledgment. Because this yaw velocity is a linear function of the longitudinal speed of the vehicle, however, the operating element deflection used as the driver information changes during braking or accelerating already in a curve with a constant radius to which the driver is not accustomed. In the steering angle control described in DE 196 00 139 C1, which is not prior art, a reaction force is exercised which counteracts the control force and which increases with a rising amount of the steering angle as well as with an increasing longitudinal vehicle speed.

U.S. Pat. No. 3,022,850 discloses an arrangement which uses a control stick, among other things, for adjusting the steering angle. For this purpose, the pertaining control stick deflection signal can be amplified as a function of the speed, specifically preferably inversely proportionally to the square of the longitudinal speed so that, independently of the longitudinal vehicle speed, a certain control stick deflection results in an essentially constant lateral acceleration.

DE 44 03 379 A1 discloses a steering system in which the ratio between the rotation angle of a steering wheel and the thus adjusted steering angle of steerable vehicle wheels can be changed as a function of the longitudinal vehicle speed to achieve, in a low to medium speed range, a sensitive steering reaction and, in a high speed range, a good stability of the steering. For this purpose, the transmission ratio of a pertaining steering gear is acted upon in a suitable manner.

In DE 196 25 498 C1, which is not prior art, an example of a steering control device is also described in which the desired steering angle value is given only as a function of the control force exercised on the operating element. Operating element deflection devices are provided which deflect the operating element corresponding to the respective existing actually steering angle value.

An object of the present invention is to provide an improved steering angle control arrangement which results in high operating comfort and high operating reliability.

The foregoing object has been achieved in accordance with the present invention by providing a steering angle control arrangement having control element deflection devices which deflect the operating element corresponding to the respective existing actual steering angle value. In this arrangement, the desired steering angle value is, on one hand, given as a variable function of the control force exercised on the operating element as well as as a function of the momentary longitudinal speed of the vehicle and, on the other hand, the operating element is deflected by suitable operating element deflection devices corresponding to the respective existing actual steering angle value and therefore independently of the vehicle longitudinal speed.

Consequently, the present invention results in the longitudinal-speed-dependent desired steering angle value indication being caused without any effect on the acknowledgment of the steering condition to the operating element. Thereby, under certain conditions, such as constant slip angles and a neutral steering tendency of the vehicle, this reaction advantageously does not change when driving a curve with a constant radius even if the longitudinal speed of the vehicle changes during this driving.

According to another aspect of the present invention, the actual steering angle value is detected by a suitable path sensor system by way of the movement of a tie rod which, as part of the steering angle adjusting device, is coupled to the steerable vehicle wheels. The desired steering angle value is indicated by a corresponding generator which, for this purpose, receives the information concerning the operating element control force from a pertaining sensor and by way of the momentary longitudinal speed of the vehicle from the corresponding vehicle longitudinal speed sensor system.

In yet a further aspect of the arrangement according to the present invention, the tie rod path sensor system is formed by a hydraulic path measuring cylinder, and the operating element deflection devices include a hydraulic cylinder configured as an actuator which is hydraulically coupled with the path measuring cylinder.

BRIEF DESCRIPTION OF THE DRAWING

Other objects, advantages and novel features of the present invention will become apparent from the following detailed description of the invention when considered in conjunction with the accompanying drawing wherein the single FIGURE shows a schematic block diagram of a steering angle control device for an automobile.

DETAILED DESCRIPTION OF THE DRAWING

The illustrated steering angle control device contains a control stick 1, also referred to as the operating element, which can be operated by one hand of the driver and which is mounted on one end of a lever 2 which is swivellably about a swivelling shaft 3 disposed on the vehicle body held in an area situated between its two ends. A force sensor 4 is arranged such on the lever 2 to detect the operating force exercised by the driver upon the control stick 1. The output signal of the force sensor 4 is supplied to a desired steering angle value generator 5 which, in addition, receives the information concerning the respective momentary vehicle longitudinal speed from a pertaining vehicle longitudinal speed sensor system 6. As a function of this supplied information, the desired steering angle value generator determines the desired steering angle value to be given for the steering control, for example, by way of a filed characteristic diagram which determines the desired steering angle value as a function, on one hand, of the control force on the control stick 1 and, on the other hand, of the sensed longitudinal speed of the vehicle.

The desired steering angle value information determined in this manner is supplied by the desired steering angle value generator 5 to a steering control unit 7 connected therebehind, e.g., in the form of a steering control device. As a function of the given desired steering angle value, this steering control device controls a steering gear 8, specifically a known type of steering actuator of the steering gear 8 which need not be illustrated in detail. As a function of this control, the steering actuator 8 acts upon a tie rod 9 coupled with the output side of the steering gear 8, and the ends of the tie rod 9 are coupled in a conventional manner to two steerable front wheels 10a, 10b.

The actual steering angle value adjusted at the steerable wheels 10a, 10b is detected in the case of the illustrated arrangement by movement of the tie rod 9. For this purpose, a piston rod 11 of a hydraulic piston/cylinder unit 12 is coupled to the tie rod 9. The cylinder 13 of the unit 12 is rigidly mounted on the vehicle body and which, in this manner, operates as the path measuring unit for the tie rod movement. The piston of this path measuring unit 12 arranged on the end side on the piston rod 11 divides the cylinder space into two working chambers from which one hydraulic line 14a, 14b originates.

The hydraulic lines 14a, 14b extend to two corresponding working chambers of another hydraulic piston/cylinder unit 15 which is used as an actuator for deflecting the control stick 1 as a function of the actual steering angle value recognized by the tie rod movement. For this purpose, the cylinder of this piston/cylinder unit 15 is, in turn, fixedly mounted on the vehicle body while a pertaining piston rod 16 is linked by way of one end to the end of the lever 2 facing away from the control stick 1. The other end of the piston rod 16 carries a piston which divides the cylinder space into two working chambers.

Thus, the two hydraulic piston/cylinder units 12, 15, together with their associated connecting hydraulic lines 14a, 14b, form control stick deflection devices for deflecting the control stick 1 only as a function of the actual steering angle value. The respective position of the control stick 1 is therefore a measurement which can be intuitively detected by the driver concerning the respective existing steering angle at the wheels 10a, 10b. The reason is that movements of the tie rod in one or the other direction and thus corresponding wheel deflection movements result in displacements of the piston of the path measuring unit 13 whereby the charged hydraulic fluid is pressed by way of hydraulic lines 14a, 14b out of one working chamber and is sucked into the other working chamber.

Correspondingly, in the piston/cylinder unit 15 acting as the actuator, the hydraulic fluid is pressed into one working chamber and is sucked out of the other working chamber, whereby its piston and therefore its piston rod 16 are displaced. By way of the lever 2, this movement of the piston rod 16 results in a corresponding swivelling and therefore deflection of the control stick 1. The respective control stick position is therefore determined independently of the momentary longitudinal vehicle speed which, in turn, together with the control force exercised on the control stick 1, determines the steering angle. The driver therefore retains, by way of the perceptible control stick position at the given actual steering angle value, for example, when driving a curve with a constant radius, a uniform steering condition information also during possible acceleration and deceleration operations.

It is understood that the acknowledgment of the actual steering angle value to the control stick 1 in the form of its deflection be caused by apparatus other than the hydraulic system shown in the sole FIGURE. For example, a mechanical coupling can also provide a way of acknowledging the actual steering angle value. As a further advantage, both embodiments result in the characteristic that the vehicle can be maintained in an emergency operation when, for example, the normal steering control path from the force sensor 4 to the steering gear 8 has failed, because the actual steering angle value will then be adjusted directly by a corresponding deflection of the control stick 1. For this purpose, a corresponding free wheel must only be provided in the steering gear 8. Then a swivel movement of the control stick 1 caused by the driver, by way of the hydraulic or mechanical coupling, will result in a corresponding movement of the tie rod 9 and thus in the desired steering movement for the wheels 10a, 10b.

According to the specific application, an acknowledgment of additional quantities concerning driving dynamics to the control stick 1 can be provided. This will be expedient particularly when the vehicle to be steered does not have an automatically cross-dynamically stabilizing device and thus the stabilizing task must be carried out by the driver. As a further example of an arrangement according to the invention, the functional dependence of the desired steering angle value on the vehicle longitudinal speed can also be implemented in that the longitudinal speed information is given directly to the steering gear and conventional devices are provided there which change the steering ratio of the gear as a function of the fed speed information. In this case, the influences of the vehicle longitudinal speed, on one hand, and of the control force exercised on the control stick, on the other hand, are not already superimposed in the desired steering angle value generator, as indicated, but only in the steering gear itself. Furthermore, it is understood that, in addition to the illustrated control stick, also operating elements of a different type can be used for the arrangement according to the invention, such as a steering wheel which is not coupled in a mechanically rigid manner with the steered vehicle wheels.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for controlling steering angle of steerable wheels of a motor vehicle, comprising a user-controllable operating element, a vehicle longitudinal speed sensor system for sensing vehicle longitudinal speed; a steering angle adjusting device operatively coupled with the vehicle longitudinal speed sensor system and the operating element such that a desired steering angle value is determined by a value generator as a function of a control force exerted on the operating element and of the sensed vehicle longitudinal speed and supplied to a steering control unit; and control element deflection devices operatively arranged to deflect the operating element corresponding to an existing actual steering angle value of said steerable wheels.

2. Arrangement according to claim 1, wherein the steering angle adjusting device comprises a force sensor coupled to the operating element, the desired steering angle value generator acted upon by the output signal of the force sensor and the vehicle longitudinal speed sensor system, the steering control unit connected behind the desired steering angle value generator, and a steering gear unit controllable by the steering control unit and having an actuator-controlled gearing and a tie rod coupled to steerable vehicle wheels, and wherein the operating element deflection devices comprise a tie rod path sensor system configured to detect the movement of the tie rod, and an operating element deflection unit arranged to deflect the control element corresponding to the tie rod movement detected by the tie rod path sensor system.

3. Arrangement according to claim 2, wherein the tie rod path sensor system comprises a hydraulic piston/cylinder path measuring unit, and the operating element deflection unit comprises a hydraulic piston/cylinder actuator unit mutually coupled with the hydraulic piston/cylinder path measuring unit via hydraulic lines.

* * * * *